(12) United States Patent
Yim et al.

(10) Patent No.: US 11,507,289 B2
(45) Date of Patent: Nov. 22, 2022

(54) STORAGE DEVICE, CONTROLLER AND METHOD FOR OPERATING STORAGE DEVICE

(71) Applicant: SK hynix Inc., Gyeonggi-do (KR)

(72) Inventors: Dong-Ham Yim, Gyeonggi-do (KR); Young-Guen Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 129 days.

(21) Appl. No.: 16/541,242

(22) Filed: Aug. 15, 2019

(65) Prior Publication Data

US 2020/0201548 A1    Jun. 25, 2020

(30) Foreign Application Priority Data

Dec. 20, 2018    (KR) .......................... 10-2018-0165910

(51) Int. Cl.
*G06F 3/06*     (2006.01)
*G06F 12/02*    (2006.01)

(52) U.S. Cl.
CPC ............ *G06F 3/064* (2013.01); *G06F 3/0658* (2013.01); *G06F 3/0679* (2013.01); *G06F 12/0246* (2013.01); *G06F 3/0607* (2013.01)

(58) Field of Classification Search
CPC ...... G06F 3/064; G06F 3/0658; G06F 3/0679; G06F 12/0246; G06F 3/0607; G06F 3/061; G06F 2212/7205; G06F 2212/7201
See application file for complete search history.

(56) References Cited

U.S. PATENT DOCUMENTS

| 2014/0137128 A1* | 5/2014 | Chang ................... G06F 9/4881 718/103 |
| 2018/0189144 A1* | 7/2018 | Song .................... G06F 11/0727 |
| 2019/0179698 A1* | 6/2019 | Liu ........................ G06F 3/0614 |
| 2020/0097403 A1* | 3/2020 | Saxena ............... G06F 12/0246 |

FOREIGN PATENT DOCUMENTS

| KR | 10-2017-0061221 | 6/2017 |
| KR | 10-2019-0123502 | 11/2019 |

* cited by examiner

*Primary Examiner* — Jason W Blust

(74) *Attorney, Agent, or Firm* — IP & T Group LLP

(57) ABSTRACT

A storage device includes a semiconductor memory device including memory blocks, planes which include the memory blocks and memory dies in which the planes are included; and a controller configured to store user data and metadata determined based on a command received from a host, in super memory blocks each including some of the memory blocks. The controller includes a segment queuing circuit configured to queue segments of the user data or the metadata to N (N is a natural number) virtual die queues according to a striping scheme; and a segment storage circuit configured to store the queued segments of the user data or the metadata in a super memory block among the super memory blocks, wherein the queued segments of the user data or the metadata are stored in the memory blocks included in the super memory block, according to a striping scheme.

16 Claims, 10 Drawing Sheets

STORAGE DEVICE, CONTROLLER AND METHOD FOR OPERATING STORAGE DEVICE

CROSS-REFERENCE TO RELATED APPLICATION

The present application claims priority to Korean Patent Application No. 10-2018-0165910, filed in the Korean Intellectual Property Office on Dec. 20, 2018, which is incorporated herein by reference in its entirety.

BACKGROUND

1. Technical Field

Various embodiments generally relate to a storage device, a controller and a method for operating a storage device.

2. Related Art

A storage device stores data based on a request of a host such as a computer and a smartphone. Since the storage device does not include a mechanical driving part, it has excellent stability, high access speed and low power consumption. Examples of such a storage device include a universal serial bus (USB) memory device, a solid state drive (SSD), a universal flash storage (UFS) device, and an embedded MMC (eMMC) device.

The storage device includes therein a semiconductor memory device to store data. The semiconductor memory device includes a plurality of memory blocks, a plurality of planes including the memory blocks and a plurality of memory dies including the planes.

SUMMARY

Various embodiments are directed to a storage device, a controller and a method for operating a storage device, capable of improving write performance while ensuring that user data indicated by a map is stored in a semiconductor memory device.

In an embodiment, a storage device may include: a semiconductor memory device including a plurality of memory blocks, a plurality of planes which include the memory blocks and a plurality of memory dies in which the planes are included; and a controller configured to receive a command from a host and store user data and metadata determined based on the received command, in a plurality of super memory blocks each including some of the memory blocks, the controller including a segment queuing circuit configured to queue segments of the user data or the metadata to N (N is a natural number) virtual die queues which are included in the controller according to a striping scheme; and a segment storage circuit configured to store the queued segments of the user data or the metadata in a super memory block among the super memory blocks, wherein the queued segments of the user data or the metadata are stored in the memory blocks included in the super memory block, according to a striping scheme.

In an embodiment, a controller suitable for receiving a command from a host and storing user data and metadata determined based on the command, in one among a plurality of super memory blocks each including memory blocks may include: a segment queuing circuit configured to queue segments of the user data or the metadata to N (N is a natural number) virtual die queues, which are included in the controller, according to a striping scheme; and a segment storage circuit configured to store the queued segments of the user data or the metadata in a super memory block among the super memory blocks, wherein the queued segments are stored in the memory blocks in the super memory block, according to a striping scheme.

In an embodiment, a method for operating a storage device including a semiconductor memory device including a plurality of memory blocks, a plurality of planes which include the memory blocks and a plurality of memory dies in which the planes are included may include: receiving a command from a host; queuing segments of user data or metadata determined based on the command, to N (N is a natural number) virtual die queues according to a striping scheme; and storing the queued segments of the user data or the metadata in memory blocks of a super memory block among a plurality of super memory blocks, wherein the queued segments of the user data or the metadata are stored in the memory blocks in the super memory block, according to a striping scheme.

According to the embodiments, a storage device, a controller and a method for operating a storage device, capable of improving write performance while ensuring that user data indicated by a map is stored in a semiconductor memory device, are provided.

DETAILED DESCRIPTION

Figure 1:
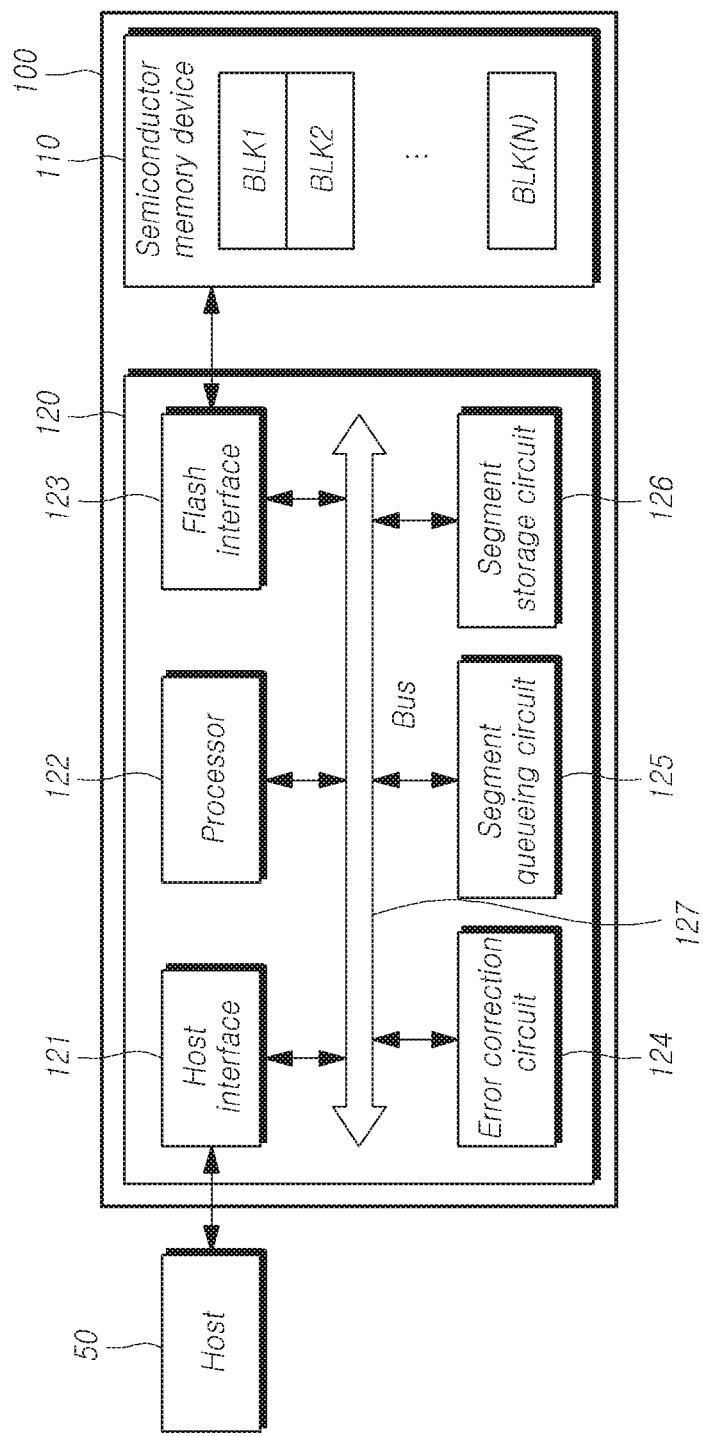
FIG. 1 is a diagram illustrating a configuration of a storage device in accordance with an embodiment of the disclosure.

In the disclosure, advantages, features and methods for achieving them will become more apparent after a reading of the following embodiments taken in conjunction with the accompanying drawings. The invention, however, may be embodied in different forms and thus should not be construed as being limited to the embodiments set forth herein. Rather, these embodiments are provided to describe the disclosure in detail to the extent that a person skilled in the art to which the disclosure pertains can practice the invention.

It is to be understood that the invention is not limited to the particulars shown in the drawings and that the drawings are not necessarily to scale and in some instances proportions may have been exaggerated in order to more clearly depict certain features of the disclosure. Like reference numerals denote like elements throughout the drawings and the description.

While particular terminology is used herein, it is to be appreciated that the terminology used herein is for the purpose of describing particular embodiments only and is not intended to limit the scope of the disclosure.

Specific structural and functional description is provided to describe embodiments of the disclosure. However, as noted above, embodiments of the disclosure may be implemented in various forms and thus the invention is not limited to either specific details or the embodiments described herein. Rather, the present invention encompasses all variations, modifications and equivalents of the disclosed embodiments to the extent they fall within the scope of the claims.

As used herein, the term "and/or" includes any and all combinations of one or more of the associated listed items. The terms such as "first" and "second" may be used to identify various components, but those components should not be limited by the terms. The terms are merely used to distinguish one component from other component(s) that have the same or similar names. For example, a first component in one instance may be designated as a second component in another instance without departing from the scope based on the concept of the disclosure.

It will be understood that, when an element is referred to as being "connected" or "coupled" to another element, it can be directly connected or coupled to the other element or one or more intervening elements may be present. In contrast, when an element is referred to as being "directly connected" or "directly coupled" to another element, there are no intervening elements present. Other representations describing relationships among components, that is, "between" and "directly between" or "adjacent to," and "directly adjacent to," should be interpreted in a similar manner.

A singular expression includes a plural expression and vice versa, unless the context indicates otherwise. The articles ° a' and 'an' as used in this application and the appended claims should generally be construed to mean 'one or more' unless specified otherwise or clear from context to be directed to a singular form. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof are present or will be added.

Unless differently defined, all terms used herein, including technical or scientific terms, have the same meanings as the terms generally understood by those skilled in the art to which the disclosure pertains. Ordinary dictionary-defined terms should be interpreted in the context of the related art, and not be interpreted in an ideal or excessively formal way, unless they are clearly so defined in the present specification.

Detailed description of well-known functions and structures incorporated herein may be omitted to avoid obscuring the subject matter of the disclosure. This aims to make the subject matter of the disclosure clearer.

Also, in describing the components of the disclosure, there may be terms used like first, second, A, B, (a), and (b). These are solely for the purpose of differentiating one component from the other but not to imply or suggest the substances, order or sequence of the components. If a component is described as "connected," "coupled" or "linked" to another component, it may mean that the component is not only directly "connected," "coupled" or "linked" but also is indirectly "connected," "coupled" or "linked" via a third component.

Various embodiments are described below with reference to the accompanying drawings to explain the disclosure in detail to the extent that a person skilled in the art can easily carry out the technical idea of the disclosure. Throughout the specification, reference to "an embodiment" or the like is not necessarily to only one embodiment, and different references to any such phrase are not necessarily to the same embodiment(s).

FIG. 1 is a diagram illustrating a configuration of a storage device in accordance with an embodiment of the disclosure.

Referring to FIG. 1, a storage device 100 may include a semiconductor memory device 110 and a controller 120.

The semiconductor memory device 110 may store data. The semiconductor memory device 110 operates in response to the control of the controller 120. The semiconductor memory device 110 may include a memory cell array including a plurality of memory cells which store data. The detailed structure of the semiconductor memory device 110 is described below with reference to FIG. 2.

In an embodiment, the semiconductor memory device 110 may be a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM) or a spin transfer torque random access memory (STT-RAM).

In an embodiment, the semiconductor memory device 110 may be realized as a three-dimensional array structure. The disclosure may be applied to not only a flash memory device in which a charge storage layer is configured by a conductive floating gate (FG) but also a charge trap flash (CTF) in which a charge storage layer is configured by a dielectric layer.

The semiconductor memory device 110 is configured to receive a command and an address from the controller 120 and access a region selected by the address in the memory cell array. In other words, the semiconductor memory device 110 may perform an operation corresponding to the command, for a region selected by the address.

For example, the semiconductor memory device 110 may perform a program operation, a read operation and an erase operation. In the program operation, the semiconductor memory device 110 may program data to a region selected by the address. In the read operation, the semiconductor memory device 110 may read data from a region selected by the address. In the erase operation, the semiconductor memory device 110 may erase data stored in a region selected by the address.

The semiconductor memory device 110 may include therein a plurality of, e.g., N, memory blocks (N is a natural number), which may be designated as BLK1, BLK2, BLK (N), respectively.

The semiconductor memory device 110 may include a plurality of planes in which the plurality of memory blocks are disposed and a plurality of memory dies in which the planes are included. An example of a configuration of memory blocks, planes and memory dies in the semiconductor memory device 110 is described below with reference to FIG. 3.

The controller 120 may control the operation of the semiconductor memory device 110 according to a request of a host 50 or in the absence of a request of the host 50. For example, the controller 120 may control write, read, erase and background operations for the semiconductor memory device 110. For example, the background operation may be a garbage collection (GC) operation, a wear leveling (WL) operation, a bad block management (BBM) operation, or the like.

In an embodiment of the disclosure, the controller 120 stores user data and metadata determined based on a command received from the host 50, in a super memory block among a plurality of super memory blocks of the semiconductor memory device 110. Each super memory block includes a group of memory blocks among the plurality of memory blocks. In another embodiment, which may not employ super memory blocks per se, sets of blocks may be identified, in which case the controller 120 stores user data and metadata determined based on a command received from the host 50 in the sets of memory blocks.

An example of configuring a super memory block is described below with reference to FIG. 4, and an example of storing user data and metadata in a super memory block among super memory blocks is described below with reference to FIGS. 5 to 9.

The controller 120 may include a host interface 121, a processor 122, a flash interface 123, an error correction circuit 124, a segment queueing circuit 125, a segment storage circuit 126 and a bus 127.

The host interface 121 provides an interface for communication with the host 50.

The processor 122 may control general operations of the controller 120, and may perform a logic calculation. The processor 122 may communicate with the host 50 through the host interface 121, and may communicate with the semiconductor memory device 110 through the flash interface 123. The processor 122 may detect an error of data stored in the semiconductor memory device 110 and may correct the error, if necessary, through the error correction circuit 124.

The processor 122 may perform the function of a flash translation layer (FTL). The processor 122 may convert a logical block address (LBA) provided by the host 50, into a physical block address (PBA), through the flash translation layer FTL. The flash translation layer (FTL) may receive the logical block address (LBA) and convert it into the physical block address (PBA), by using a mapping table. There are various address mapping methods of the flash translation layer, depending on a mapping unit. Representative address mapping methods include a page mapping method, a block mapping method and a hybrid mapping method.

The processor 122 is configured to randomize data received from the host 50. For example, the processor 122 may randomize the data received from the host 50, by using a randomizing seed. Randomized data as data to be stored is provided to the semiconductor memory device 110 and is programmed in the memory cell array.

The processor 122 is configured to derandomize data received from the semiconductor memory device 110, in a read operation. For example, the processor 122 may derandomize data received from the semiconductor memory device 110, by using a derandomizing seed. Derandomized data may be outputted to the host 50.

The flash interface 123 provides an interface for communication with the semiconductor memory device 110.

The error correction circuit 124 may perform error correction for data to be stored in the semiconductor memory device 110. The error correction circuit 124 may verify an error for data stored in the semiconductor memory device 110.

The segment queueing circuit 125 queues the segments of user data and metadata in N virtual die queues according to a striping scheme. N is a natural number.

The virtual die queues are used to control a sequence in which the segments of user data and metadata generated by the controller 120 are stored in the semiconductor memory device 110. When a first-in-first-out (FIFO) scheme is applied to the virtual die queues, the queued segments are outputted in the sequence in which they are inputted.

The number of virtual die queues N is not necessarily the same as the number of memory dies included in the semiconductor memory device 110; that is, the number of memory dies and the number of virtual die queues may be different from each other. Also, segments queued in the same virtual die queue are not necessarily stored in the same memory die.

The striping scheme means a scheme in which data is divided into a plurality of segments and the divided segments are processed by being sequentially distributed to a plurality of elements (e.g., the virtual die queues and the memory dies). An example in which the segments of user data and metadata are queued in N virtual die queues according to a striping scheme is described below in detail with reference to FIGS. 6 and 7.

The segment storage circuit 126 stores the queued segments of the user data and the metadata in an super memory, block among the plurality of super memory blocks, which super block includes some of the plurality of memory blocks of the semiconductor memory device 110.

The segments of the user data or the metadata stored in the super memory block may be stored in the plurality of memory blocks included in the super memory block according to a striping scheme.

The bus 127 may be configured to provide channels among the components of the controller 120.

Figure 2:
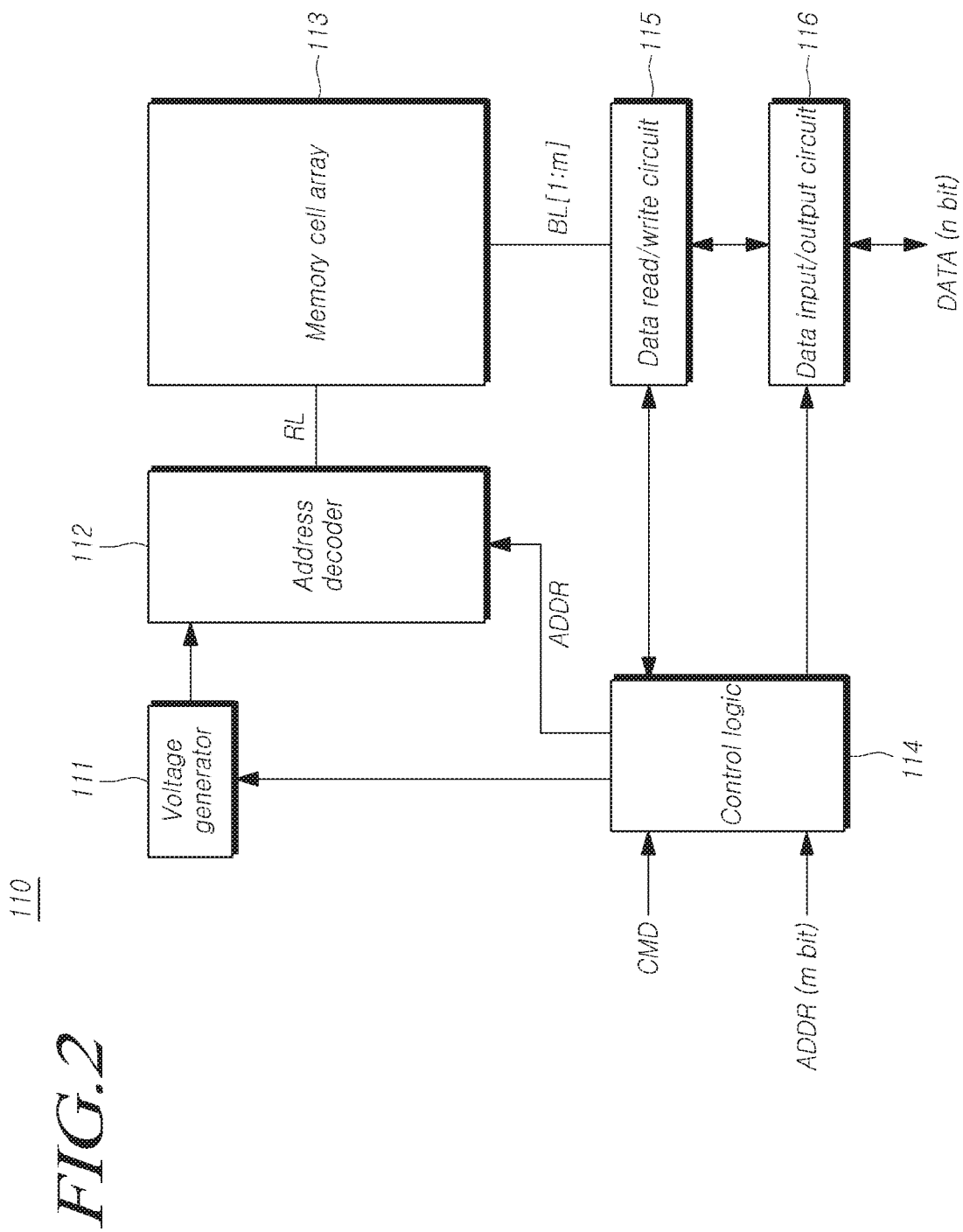
FIG. 2 is a illustrating a structure of a semiconductor memory device, such as that of FIG. 1.

FIG. 2 is a diagram illustrating a structure of the semiconductor memory device of FIG. 1.

Referring to FIG. 2, the semiconductor memory device 110 may include a voltage generator 111, an address decoder 112, a memory cell array 113, control logic 114, a data read/write circuit 115 and a data input/output circuit 116.

First, the memory cell array 113 includes a plurality of memory blocks. The plurality of memory blocks are coupled to the address decoder 112 through row lines RL. The plurality of memory blocks are coupled to the data read/write circuit 115 through bit lines BL[1:m].

As described above with reference to FIG. 1, the semiconductor memory device 110 may include a plurality of planes each of which includes some of the plurality of memory blocks in the memory cell array 113. The semiconductor memory device 110 may include a plurality of memory dies, each of which includes some of the plurality of planes.

Each of the plurality of memory blocks includes a plurality of memory cells. The plurality of memory cells may be volatile memory cells or nonvolatile memory cells. Among the plurality of memory cells, memory cells which are coupled to the same word line are defined as one page. That is to say, the memory cell array 113 may be configured by a plurality of pages.

In an embodiment, each of the plurality of memory blocks may include a plurality of dummy cells. At least one of the dummy cells may be coupled in series between a drain select transistor and memory cells and between a source select transistor and memory cells.

Each of the memory cells included in the memory cell array 113 may be configured by a single level cell (SLC) storing one data bit, a multi-level cell (MLC) storing two data bits, a triple level cell (TLC) storing three data bits or a quad level cell (QLC) storing four data bits.

The address decoder 112 is coupled to the memory cell array 113 through the row lines RL. The row lines RL may include drain select lines, word lines, source select lines and a common source line. In an embodiment, the word lines may include normal word lines and dummy word lines. In an embodiment, the row lines RL may further include a pipe select line.

The address decoder 112 is configured to operate in response to the control of the control logic 114. The address decoder 112 receives an address ADDR from the control logic 114.

The address decoder 112 is configured to decode a block address in the received address ADDR. The address decoder 112 selects at least one memory block among the memory blocks depending on the decoded block address. The address decoder 112 is configured to decode a row address in the received address ADDR. The address decoder 112 may apply voltages provided from the voltage generator 111 to at least one word line WL, depending on the decoded row address, and thereby, may select at least one word line in the selected memory block.

In a program operation, the address decoder 112 may apply a program voltage to a selected word line and may apply a pass voltage of a level lower than the program voltage to unselected word lines. In a program verify operation, the address decoder 112 may apply a verify voltage to the selected word line and may apply a verify pass voltage higher than the verify voltage to the unselected word lines.

In a read operation, the address decoder 112 may apply a read voltage to a selected word line and may apply a pass voltage higher than the read voltage to unselected word lines.

In an embodiment, an erase operation of the semiconductor memory device 110 is performed on a memory block basis. The address ADDR inputted to the semiconductor memory device 110 in the erase operation includes a block address. The address decoder 112 may decode the block address, and may select one memory block depending on the decoded block address. In the erase operation, the address decoder 112 may apply a ground voltage to word lines which are coupled to a selected memory block.

In an embodiment, the address decoder 112 may be configured to decode a column address in the received address ADDR. The decoded column address (DCA) may be transferred to the data read/write circuit 115. For instance, the address decoder 112 may include components such as a row decoder, a column decoder and an address buffer.

The voltage generator 111 is configured to generate a plurality of voltages by using an external power supply voltage supplied to the semiconductor memory device 110. The voltage generator 111 operates in response to the control of the control logic 114.

In an embodiment, the voltage generator 111 may generate an internal power supply voltage by regulating the external power supply voltage. The internal power supply voltage generated in the voltage generator 111 is used as an operating voltage of the semiconductor memory device 110.

In an embodiment, the voltage generator 111 may generate a plurality of voltages by using the external power supply voltage or the internal power supply voltage. The voltage generator 111 may be configured to generate various voltages required in the semiconductor memory device 110. For example, the voltage generator 111 may generate a plurality of program voltages, a plurality of pass voltages, a plurality of selected read voltages and a plurality of unselected read voltages.

For example, the voltage generator 111 may include a plurality of pumping capacitors which receive the internal power supply voltage, and may generate the plurality of voltages by selectively activating the plurality of pumping capacitors in response to the control of the control logic 114.

The plurality of generated voltages may be supplied to the memory cell array 113 by the address decoder 112.

The data read/write circuit 115 may include first to mth page buffers, which are coupled to the memory cell array 113 through the first to m^th bit lines BL[1:m], respectively. The first to mth page buffers operate in response to the control of the control logic 114.

The first to mth page buffers perform data communication with the data input/output circuit 116. In a program operation, the first to mth page buffers receive data DATA to be stored, through the data input/output circuit 116.

In the program operation, the first to mth page buffers may transfer the data DATA to be stored, that is, the data DATA received through the data input/output circuit 116, to selected memory cells through bit lines BL, when a program pulse is applied to a selected word line. The memory cells of a selected page are programmed according to the transferred data DATA. A memory cell coupled with a bit line to which a program permission voltage (for example, a ground voltage) is applied may have an increased threshold voltage. The threshold voltage of a memory cell coupled with a bit line to which a program inhibition voltage (for example, a power supply voltage) is applied may be retained. In a program verify operation, the first to mth page buffers read page data through the bit lines BL from the selected memory cells.

In a read operation, the data read/write circuit 115 reads data DATA through bit lines BL from the memory cells of a selected page, and outputs the read data DATA to the data input/output circuit 116.

In an erase operation, the data read/write circuit 115 may float the bit lines BL. As an embodiment, the data read/write circuit 115 may include a column select circuit.

The data input/output circuit 116 is coupled to the first to m^th page buffers through data lines. The data input/output circuit 116 operates in response to the control of the control logic 114.

The data input/output circuit 116 may include a plurality of input/output buffers (not illustrated) which receive data to be inputted. In a program operation, the data input/output circuit 116 receives data DATA to be stored, from an external controller (not illustrated). In a read operation, the data input/output circuit 116 outputs data transferred from the first to mth page buffers included in the data read/write circuit 115, to the external controller.

The control logic 114 may be coupled to the address decoder 112, the voltage generator 111, the data read/write circuit 115 and the data input/output circuit 116. The control logic 114 may be configured to control general operations of the semiconductor memory device 110. The control logic 114 may operate in response to a command CMD transferred from an external device.

Figure 3:
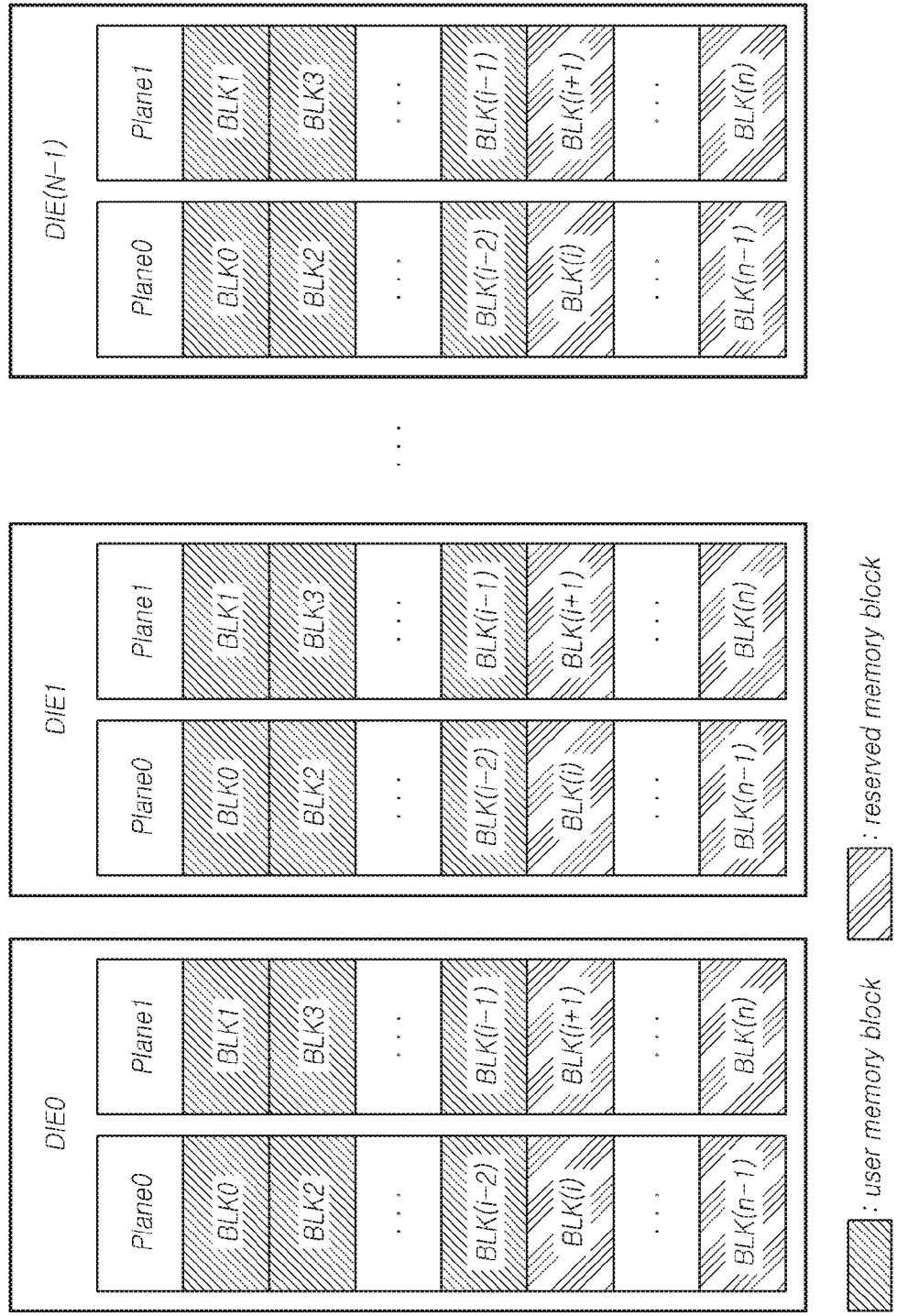
FIG. 3 is a diagram illustrating a configuration of memory blocks, planes and memory dies of a semiconductor memory device, such as that of FIG. 1.

FIG. 3 is a diagram illustrating a configuration of memory blocks, planes and memory dies of the semiconductor memory device 110 of FIG. 1.

The semiconductor memory device 110 of FIG. 1 includes N memory dies, where N is a natural number, which may be designated as DIE0, DIE1, ..., DIE(N−1).

Each memory die may include two planes Plane0 and Plane1. Each plane may include therein a plurality of memory blocks. While it is described as an example with reference to FIG. 3 that two planes are included in each memory die, it is to be noted that more than two planes may be included in each memory die.

Each of the memory blocks may be classified as a user memory block or a reserved memory block. The user memory block is generally used to store the user data and the metadata described above, and the reserved memory block is used to replace a user memory block that is or becomes a bad block.

Figure 4:
FIG. 4 is a diagram illustrating a scheme for configuring a super memory block, such as that in FIG. 3.

FIG. 4 is a diagram illustrating an example of a scheme for configuring a super memory block in FIG. 3.

Referring to FIG. 4, a super memory block may be configured by grouping some memory blocks in each memory die, instead of being configured by only memory blocks of specified memory dies.

For instance, a super memory block #0 may be configured is to include a memory block BLK0 (in the plane Plane0) and a memory block BLK1 (in the plane Plane1) of each memory die.

In the case where super memory blocks are configured as described above, a problem may be caused in that the number of memory blocks capable of being used to store data in different super memory blocks may vary.

For example, while all of the 2*N number of memory blocks included in the super memory block #0 are normal memory blocks, in the case of another super memory block, at least one memory block among 2*N number of memory blocks, may be a bad block. Since a bad block cannot be used to store data, a super memory block having bad block(s) has less memory blocks capable of storing data compared with a super memory block not having any bad blocks.

In order to prevent such a problem, each super memory block having a bad block may be configured or reconfigured by replacing the bad block with one among reserved memory blocks such that the number of memory blocks capable of being used to stored data in each super memory block is maintained the same for all super memory blocks.

For instance, in the case of a super memory block #1, among the memory blocks included therein, memory blocks BLK(i−2) and BLK(i−1) in a memory die DIE1 and a memory block BLK(i−1) in a memory die DIE(N−1) may be bad blocks. In this case, each of the bad blocks may be replaced with a reserved memory block in the same die as the bad block it replaces. Specifically, the memory block BLK(i−2) in the memory die DIE1 may be replaced with a reserved memory block BLK(i) of the memory die DIE1, the memory block BLK(i−1) in the memory die DIE1 may be replaced with a reserved memory block BLK(i+1) of the memory die DIE1, and the memory block BLK(i−1) in the memory die DIE(N−1) may be replaced with a reserved memory block BLK(i+1) of the memory die DIE(N−1). As a result, the number of memory blocks capable of being used to store data in the super memory block #1 becomes 2*N, which is the same number in the super memory block #0.

While the above description provides an example where a bad block and its reserved memory block replacement are disposed in the same die, the invention is not limited to that specific configuration. Rather, a bad block may be replaced by a reserved memory block that is in a different dies than the bad block. In this case, in any given super memory block, the number of memory blocks in respective memory dies may be different from one another.

Figure 5:
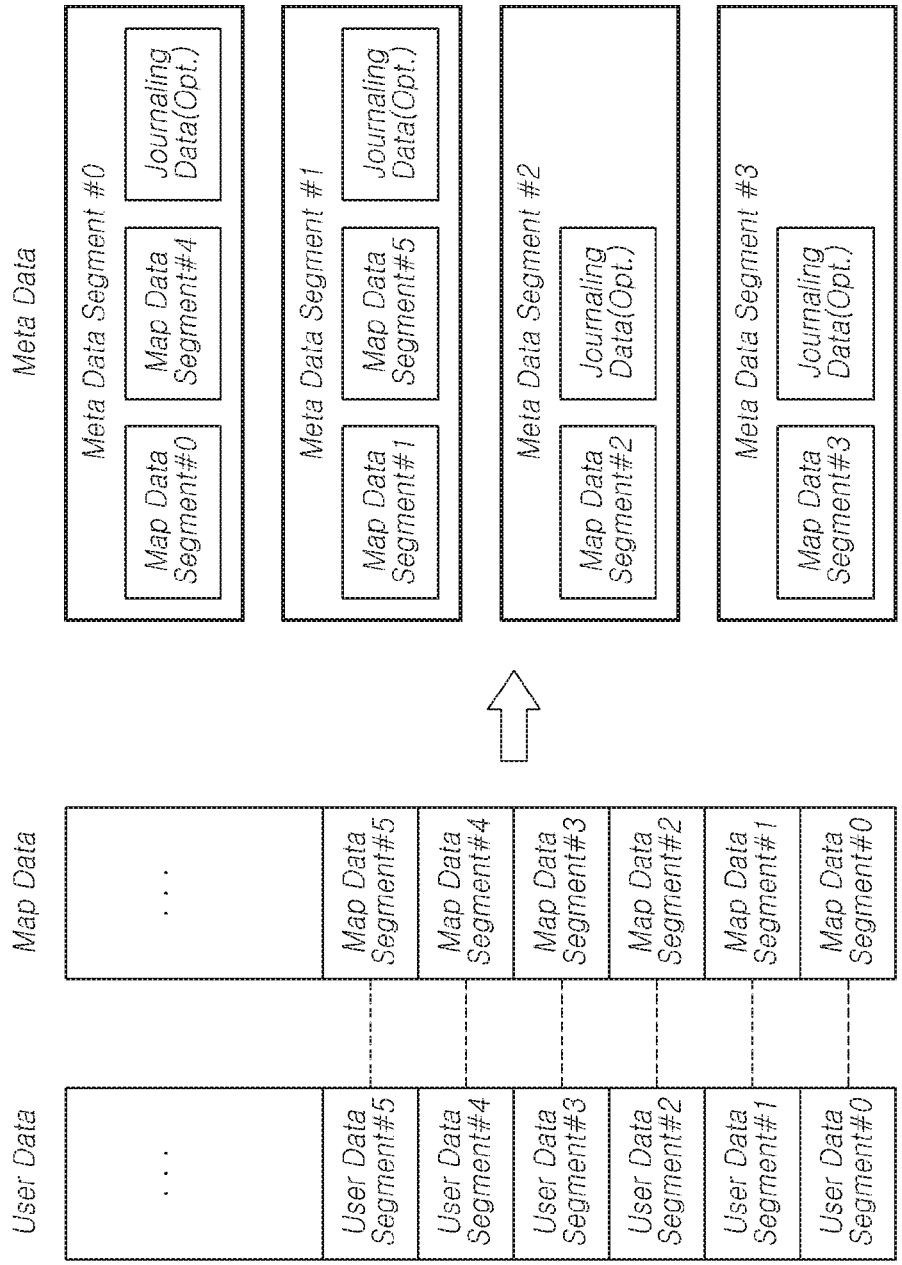
FIG. 5 is a diagram illustrating a scheme for configuring segments of user data and metadata based on the user data and map data.

FIG. 5 is a diagram illustrating an example of a scheme for configuring segments of user data and metadata based on the user data and map data.

First, user data may be divided into a plurality of segments (user data segments). Referring to FIG. 5, user data may be divided into a user data segment #0, a user data segment #1, a user data segment #2, a user data segment #3, a user data segment #4, a is user data segment #5, ....

The segments of metadata (metadata segments) are generated based on user data and a map including an L2P (logical to physical) information on positions where the user data is stored in the semiconductor memory device 110. The map receives the values of the addresses of logical pages and indicates the addresses of physical pages corresponding to the addresses of the corresponding logical pages. Since the map is configured in the form of a table, it may be referred to as a map table.

If a command (e.g., a write command) is inputted from the host 50, as user data for the command is stored in memory blocks in the semiconductor memory device 110, information on a position where the user data is stored in the semiconductor memory device 110 is recorded in the map. In order to access the user data stored in the semiconductor memory device 110, the map indicating the position where the user data is stored is required.

In order to access the user data stored in the semiconductor memory device 110 even after a power-off and on, the map is stored in the semiconductor memory device 110. When so stored, the map may be stored in a separate super memory block for storing the map, different from a super memory block in which the user data is stored.

An example of a process in which the map is stored in the semiconductor memory device 110 may progress as follows.

When the storage device 100 is booted, the controller 120 loads all or a part of the map stored in the semiconductor memory device 110, to a RAM (e.g., an SRAM or a DRAM), which may be referred to as a map cache.

If the user data is added/corrected/erased while the command from the host 50 is processed, the loaded map is changed, and, in order to ensure that the map is properly maintained even after the power-off and on, the data of the loaded map is stored in the semiconductor memory device 110 at a predetermined period (e.g. once per 1 ms).

In order to store data constituting the map (map data) in the semiconductor memory device 110, a scheme may be used in which metadata including the map data for the user data is generated and the generated metadata is stored in the semiconductor memory device 110.

In an embodiment of the disclosure, in the same manner as the user data, the metadata may also be stored in the semiconductor memory device 110 by being divided into a plurality of segments. Each segment of the metadata may store at least one map data segment, and may include map data for a specific user data segment.

In detail, the user data is divided into a user data segment #0, a user data segment #1, a user data segment #2, a user data segment #3, a user data segment #4, a user data segment #5, ... and map data for the respective user data segments are a map data segment #0, a map data segment #1, a map data segment #2, a map data segment #3, a map data segment #4, a map data segment #5, . . . .

In FIG. 5, a metadata segment #0 may include the map data segment #0 and the map data segment #4. That is to say, the metadata segment #0 includes map data for the user data segment #0 and the user data segment #4. Similarly, a metadata segment #1 may include map data for the user data segment #1 and the user data segment #5, a metadata segment #2 may include map data for the user data segment #2, and a metadata segment #3 may include map data for the user data segment #3.

Each metadata segment may include not only map data for user data but also journaling information on at least one of the user data and the map data.

Journaling information on data, which is information indicating the change history of the data (e.g., a change time, the position of changed data, etc.), is used to track a history of changes to the data is changed or corrections of errors in the data. In the case where an error occurs in map data in a metadata segment, if journaling information on the map data is stored together with map data in the semiconductor memory device 110, the error of the map data may be corrected based on the journaling information.

The number of map data segments in each metadata segment may be less than or equal to a set threshold number of segments. If the number of such map data segments increases, write performance may deteriorate because the metadata segment may be stored after all user data corresponding to the corresponding map data segments is stored in the semiconductor memory device 110. Thus, it is necessary to reduce the size of a metadata segment, such that, when a set amount of user data is stored in the semiconductor memory device 110, map data for the stored user data may be immediately stored in the semiconductor memory device 110.

Figure 6:
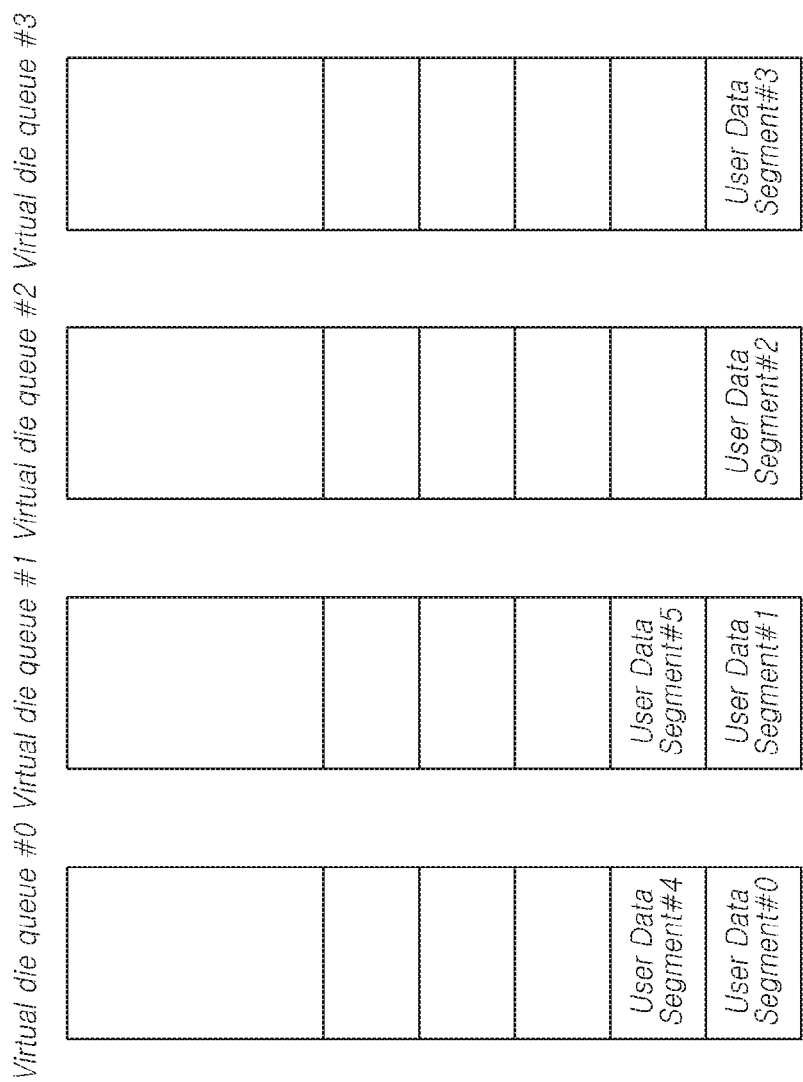
FIG. 6 is a diagram illustrating an example in which segments of user data are queued in virtual die queues according to a striping scheme.

FIG. 6 is a diagram illustrating an example in which segments of user data are queued in virtual die queues according to a striping scheme.

In the embodiment of FIG. 6, there are four virtual die queues, which are referred to as a virtual die queue #0, a virtual die queue #1, a virtual die queue #2 and a virtual die queue #3. This, however, is merely an example. There may be more or less than four virtual die queues depending on system configuration and use. The virtual die queues are realized in the flash translation layer FTL and a VFL (virtual flash layer).

A user data segment #(I) is inputted to or queued in a virtual die queue #(I mod 4). In an embodiment of the disclosure, the segment queueing circuit 125 may input the user data segment #(I) to the virtual die queue #(I mod 4).

Figure 7:
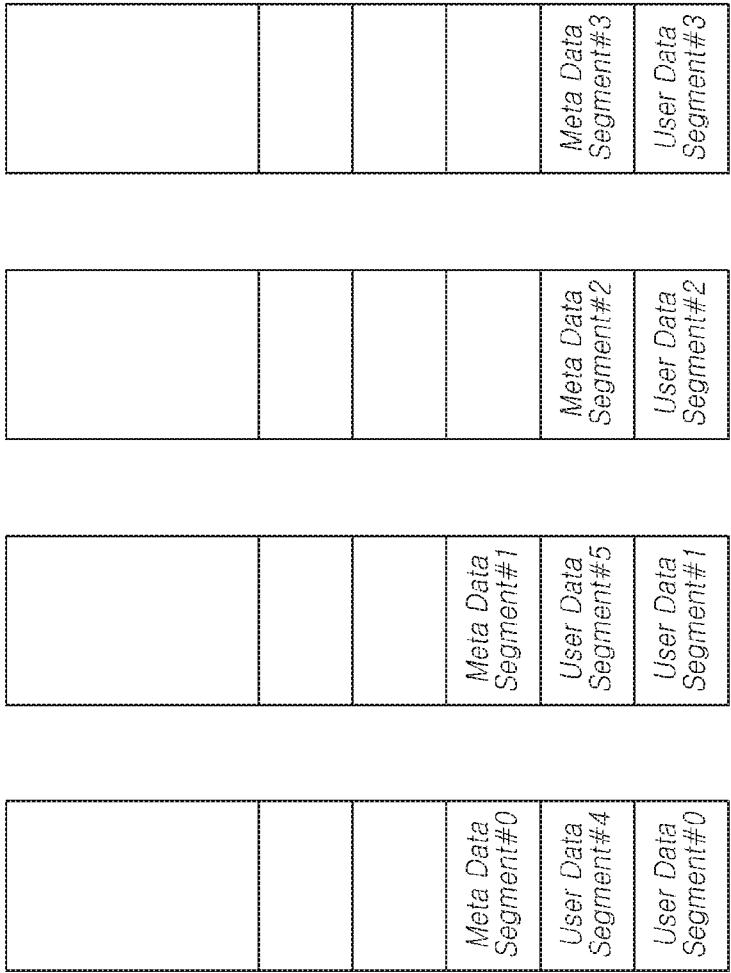
FIG. 7 is a diagram illustrating an example in which segments of metadata are queued in virtual die queues according to a striping scheme.

FIG. 7 is a diagram illustrating an example in which segments of metadata are queued in virtual die queues according to a striping scheme.

In an embodiment of the disclosure, similar to the user data segment #(I), a metadata segment #(I) is inputted to or queued in the virtual die queue #(I mod 4). In an embodiment of the disclosure, the segment queueing circuit 125 may input the metadata segment #(I) to the virtual die queue #(I mode 4).

As described above with reference to FIG. 5, the metadata segment #0 includes the map data for the user data segment #0 and the user data segment #4. Referring to the virtual die queue #0 of FIG. 7, the user data segment #0 and the user data segment #4 are stored first in the virtual die queue #0, and thereafter, the map data for the user data segment #0 and the user data segment #4 is queued in the virtual die queue #0. In other words, in each virtual die queue, user data is outputted earlier than map data for the corresponding user data, to be stored in a memory block in the semiconductor memory device 110.

The reason why user data and map data are stored in the semiconductor memory device 110 according to a striping scheme and the user data is outputted earlier than the map data for the corresponding user data is as follows.

In general, when storing user data in the semiconductor memory device 110 based on a command received from the host 50, a map is updated in advance before the user data is stored in the semiconductor memory device 110. Doing so is advantageous in that the map may be updated in a sequence in which write operations are performed.

Updating the map after checking information on a result of storing the user data in the semiconductor memory device 110, through a status command, is disadvantageous in that it complicates the processing. That is, the map needs to be updated considering the difference between a sequence in which write operations are requested and a sequence in which the writing operations are completely performed in the semiconductor memory device 110.

However, the scheme of updating the map earlier than the user data may have a problem in the case where an SPO (sudden power-off) occurs.

When power is turned on after an SPO occurs, the user data which is indicated by the map stored in the semiconductor memory device 110 should be read without error after an SPOR (sudden power-off recovery). On the other hand, since user data not indicated by the map is impossible to be accessed through the map, it is not necessary for the corresponding user data to be stored in the semiconductor memory device 110 without error.

However, if an SPO occurs before the user data is stored in the semiconductor memory device 110 after the map is first stored in the semiconductor memory device 110, it is impossible to read the user data which is indicated by the map without error, when the power is turned on thereafter.

This is highly likely to occur when a memory die in which the map is stored and a memory die in which the user data is stored are different. Because there is a difference in write performance between the memory dies, the memory die in which the map is stored may first complete a write operation for the map, and then, the memory die in which the user data is stored may complete a write operation for the user data.

In order to solve this problem, the following method may be considered.

1) There is a scheme in which, after the map loaded to the RAM is updated and then an operation of storing all user data in the semiconductor memory device 110 is completed, the map is updated in the semiconductor memory device 110. In this case, even though an SPO occurs, a situation in which it is impossible to read the user data indicated by the map without error does not occur. However, in order to update the map in the semiconductor memory device 110, it is necessary to wait until all the user data is completely stored in the semiconductor memory device 110. Thus, a problem may be caused in terms of performance.

2) There is a scheme in which the user data is stored in the semiconductor memory device 110 and then the map is updated after the storage is completed. In this case, a problem may be caused in that, with respect to a plurality of user data write requests, a sequence in which the host 50 executes the respective user data write requests and a sequence in which the user data write requests are actually completed in the semiconductor memory device 110 may be different from each other. Therefore, a problem may be caused in that implementation of the processing is complicated since the map should be updated according to the sequence in which the host 50 executes the write requests.

Therefore, in embodiments of the disclosure, in order to solve the problems of the schemes 1) and 2), a scheme is used in which user data and map data are stored in the semiconductor memory device 110 according to a striping scheme and only a sequence in which a user data segment and map data for the corresponding user data segment are stored in the semiconductor memory device 110 is observed.

Namely, with respect to a specific user data segment, it is not necessary for an entire map to be stored in the semiconductor memory device 110 after the corresponding user data segment, and the order in which map data corresponding to the corresponding user data segment in the map is stored needs to be observed. Therefore, by queueing together a specific user data segment and a metadata segment including map data corresponding to the corresponding user data segment to the same virtual die queue, a storage sequence may be observed.

Through this, it is possible to realize a storage device capable of minimizing deterioration in write performance while allowing recovery to be properly performed upon the occurrence of an SPO.

Figure 8:
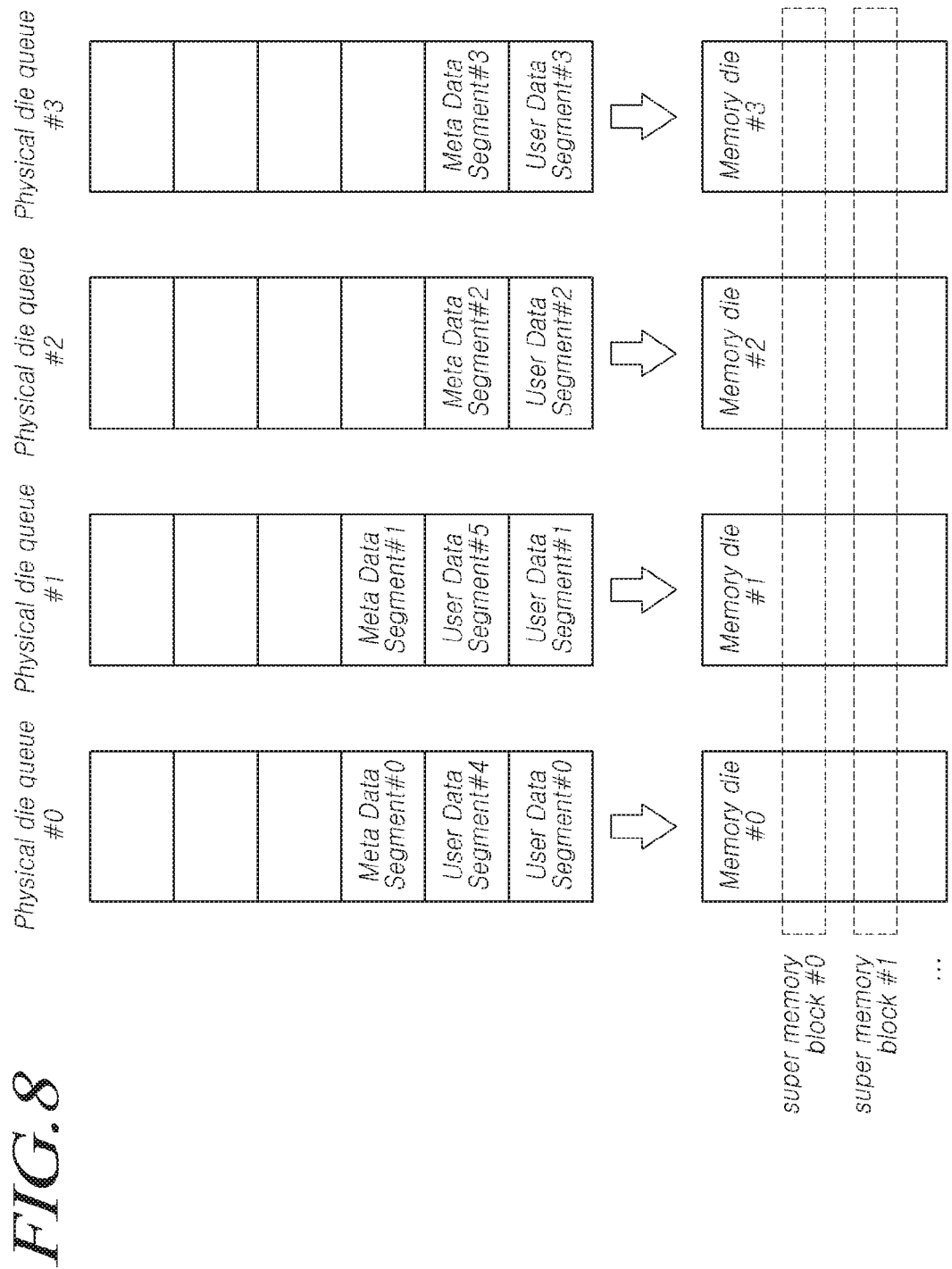
FIG. 8 is a diagram illustrating an example in which segments of user data or metadata queued in virtual die queues are stored in memory dies.

FIG. 8 is a diagram illustrating an example in which segments of user data or metadata queued in virtual die queues are stored in memory dies.

FIG. 8 illustrates a case where a user data segment or a metadata segment queued in a virtual die queue #(I) is stored in a memory die #(I) (I=0, 1, 2, 3).

There is a physical die queue for each memory die in the semiconductor memory device 110, and a user data segment and a metadata segment to be stored in a memory die are stored in the memory die in a sequence in which they are queued in a physical die queue for the corresponding memory die. The physical die queue may be realized through a separate buffer which is disposed in the semiconductor memory device 110.

As illustrated in FIGS. 3 and 4, memory blocks in each memory die are included in a super memory block among the plurality of super memory blocks (the super memory block #0, the super memory block #1, . . . ). Hence, the user data segment and the metadata segment stored in each memory die are included in the super memory block. Therefore, by inputting a user data segment and a metadata segment to a physical die queue #(I) in a sequence in which they are queued in a virtual die queue #(I), a sequence in which the user data segment and the metadata segment are stored in each memory die is maintained without error.

Figure 9:
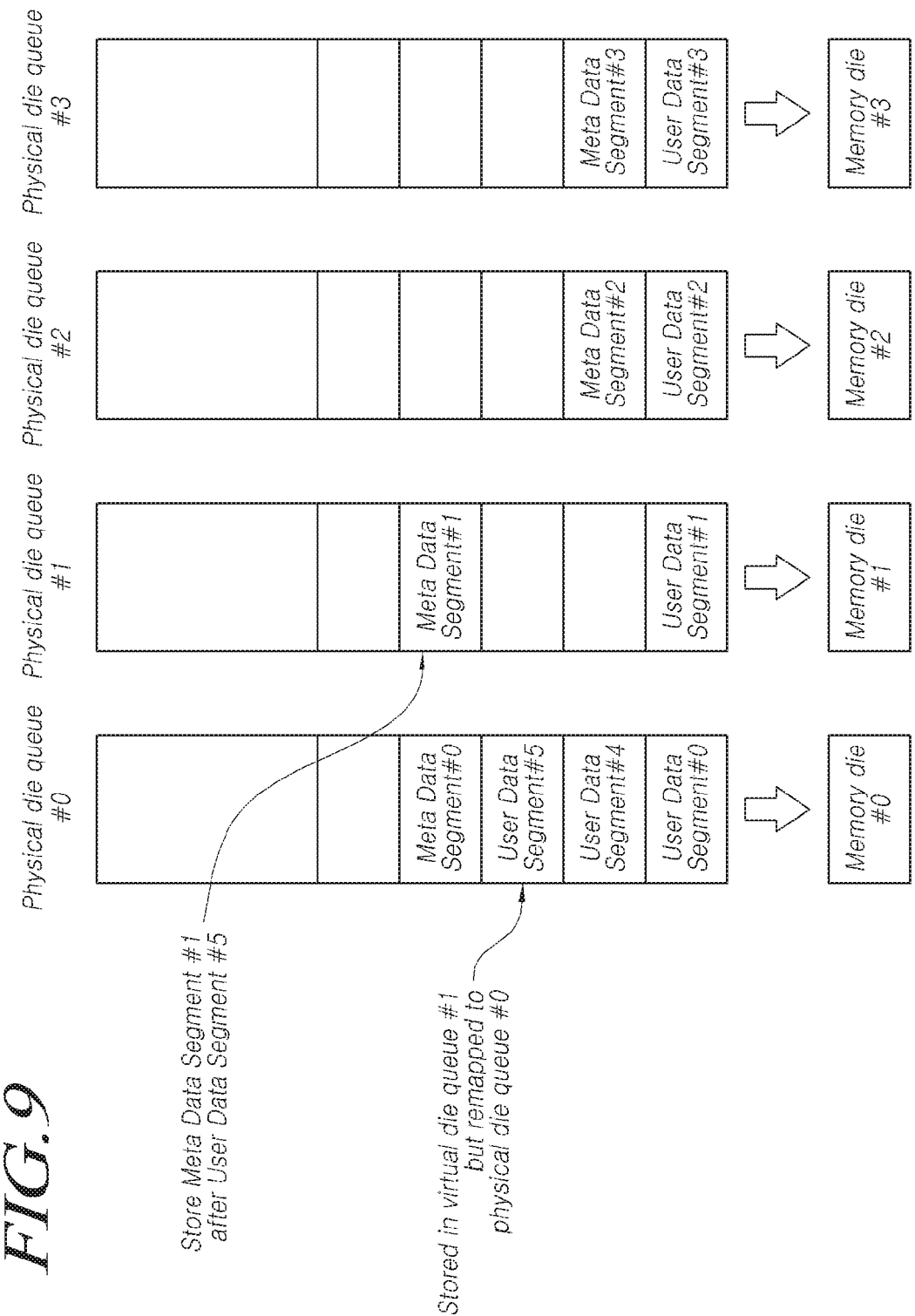
FIG. 9 is a diagram illustrating another example in which segments of user data or metadata queued in virtual die queues are stored in memory dies.

FIG. 9 is a diagram illustrating another example in which segments of user data or metadata queued in virtual die queues are stored in memory dies.

As described above with reference to FIG. 1, in an embodiment of the disclosure, the number of virtual die queues and the number of memory dies in the semiconductor memory device 110 are not necessarily the same as each other. Also, all of a user data segment and a metadata segment queued in a virtual die queue #(I) are not necessarily stored in the same memory die.

For instance, in a super memory block in which user data is stored, a memory die in which the user data segment #5 is actually stored may be not the memory die #1 but the memory die #0. This case may occur when a memory block in the memory die #1 becomes a bad block and is thus remapped to a reserved memory block in the memory die #0.

Thus, a memory die (the memory die #0) in which the user data segment #5 is recorded and a memory die (the memory die #1) in which the metadata segment #1 including the map data for the user data segment #5 is recorded may be different from each other. In this case, due to a difference in write speed between the memory dies, the metadata segment #1 may be stored earlier than the user data segment #5. Thus, if an SPO occurs after the metadata segment #1 is stored but before the user data segment #5 is stored, a problem may be caused in that the map data for the user data segment #5 is stored in the semiconductor memory device 110 but the user data segment #5 is not stored in the semiconductor memory device 110.

Therefore, in order to prevent such a problem, the segment storage circuit 126 may control a storage sequence among the segments queued in each virtual die queue to be observed. That is to say, each segment queued in a virtual die queue #(I) may be stored in one of the super memory blocks of the semiconductor memory device 110 after all the segments inputted before the corresponding segment are stored in one of the super memory blocks of the semiconductor memory device 110.

For example, in FIG. 8, the metadata segment #1 is queued in the virtual die queue #1, and, in the virtual die queue #1, the user data segment #1 and the user data segment #5 are queued earlier than the metadata segment #1. Therefore, the segment storage circuit 126 stores the metadata segment #1 in the semiconductor memory device 110 after at least the user data segment #1 and the user data segment #5 are completely stored in the semiconductor memory device 110.

Through this, it is possible to ensure that, when map data is stored in the semiconductor memory device 110, user data indicated by the corresponding map data is also stored in the semiconductor memory device 110.

However, a storage sequence needs to be observed only among the segments queued in each virtual die queue, and does not need to be observed among the segments queued in different virtual die queues. For example, since the metadata segment #0 and the metadata segment #1 are queued in different virtual die queues, either one of them may be first stored in the semiconductor memory device 110.

Figure 10:
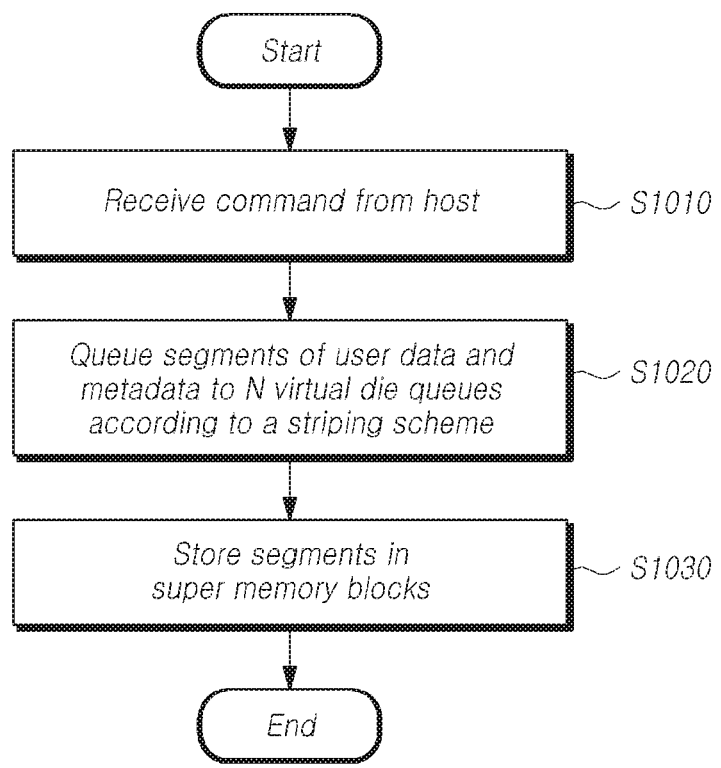
FIG. 10 is a flow chart illustrating an operation of a storage device in accordance with an embodiment of the disclosure.

FIG. 10 is a flow chart illustrating an operation of a storage device in accordance with an embodiment of the disclosure. By way of example, the operation is described in the context that it is performed by the storage device 100 previously described.

Referring to FIG. 10, the controller 120 of the storage device 100 receives a command from the host 50 (S1010).

The segment queueing circuit 125 in the controller 120 of the storage device 100 queues the segments of user data or metadata determined based on the command received to N virtual die queues according to a striping scheme (S1020), where N defines any suitable number of virtual die queues.

As described above with reference to FIG. 5, metadata may include map data for user data, and may include journaling information on at least one of the user data and the map data.

Lastly, the segment storage circuit 126 in the controller 120 of the storage device 100 stores the segments of the user data or the metadata queued in the virtual die queues in a super memory block among the plurality of super memory blocks, which super memory block includes a plurality of memory blocks (S1030).

As described above with reference to FIG. 4, the number of memory blocks in each super memory block may be kept the same.

The segments of the user data or the metadata are stored in a plurality of memory blocks in the super memory block, in a striping scheme described above.

It will be understood by those skilled in the art that technical configurations described above can be modified or embodied in other arrangements without departing from the spirit and essential characteristics of the disclosure. Therefore, it should be understood that the embodiments described above are as illustrative and not restrictive. The scope of the invention is defined by the appended claims and their equivalents rather than the foregoing description, and all changes or modifications that fall within the scope of the claims and their equivalents are encompassed by the invention.

In the above described embodiments of the disclosure, some steps may be selectively performed or omitted. Moreover, the steps do not necessarily need to be performed in the sequential order as depicted, and they may be performed in a changed order.

Those skilled in the art will understand from the disclosure that various modifications and changes can be made thereto without departing from the broader spirit and scope of the disclosure. Thus, the present invention encompasses not only the disclosed embodiments but all changes and modifications that fall within the scope of the claims and their equivalents.

What is claimed is:

1. A storage device comprising:
    a semiconductor memory device including a plurality of memory blocks, a plurality of planes which include the memory blocks and a plurality of memory dies in which the planes are included; and
    a controller configured to store user data and metadata determined based on a command received from a host, in a plurality of super memory blocks, each including some of the memory blocks,
    the controller comprising:
    a segment queueing circuit configured to queue user-data segments of the user data or metadata segments of the metadata to N virtual die queues, which are included in the controller, according to a striping scheme, where N is a natural number; and
    a segment storage circuit configured to store the user-data segments of the user data or the metadata segments of the metadata in a super memory block among the super memory blocks,
    wherein the user-data segments and the metadata segments corresponding to the user-data segments are queued in the same virtual die queue, and the user-data segments are queued into the same virtual die queue earlier than the metadata segments corresponding to the user-data segments, and
    wherein, in response to a possibility of a sudden power off (SPO) before the user data is stored, the user-data segments are stored in the memory blocks in the super memory block before the metadata segments corresponding to the user-data segments are transferred to a memory die of the super memory block by delaying initial transfer of the metadata segments until the associated user-data segments are stored in the memory die in order to ensure that the user-data segments and the metadata segments are both stored in the super memory block at the time of SPO.

2. The storage device according to claim 1, wherein the controller controls the semiconductor memory device to keep the number of memory blocks in each of the super memory blocks the same.

3. The storage device according to claim 1, wherein the respective metadata segments comprise respective pieces of map data for the respective user-data segments.

4. The storage device according to claim 3, wherein the respective metadata segments comprise journaling information on at least one of the respective user-data segments and the respective pieces of map data.

5. The storage device according to claim 1, wherein the segment storage circuit stores the user-data segments or the metadata segments in the super memory block in a sequence in which the user data or the metadata are queued to each virtual die queue.

6. The storage device according to claim 1, wherein the segment storage circuit stores the user-data segments before the metadata segments corresponding to the user-data segments are stored in the semiconductor memory device.

7. A controller suitable for storing user data and metadata determined based on a command received from a host, in one among a plurality of super memory blocks, each including memory blocks, the controller comprising:
    a segment queueing circuit configured to queue user-data segments of the user data or metadata segments of the metadata to N virtual die queues, which are included in the controller, according to a striping scheme, where N is a natural number; and
    a segment storage circuit configured to store the user-data segments of the user data or the metadata segments of the metadata in a super memory block among the super memory blocks,
    wherein the user-data segments and the metadata segments corresponding to the user-data segments are queued in the same virtual die queue, and the user-data segments are queued into the same virtual die queue earlier than the metadata segments corresponding to the user-data segments, and
    wherein, in response to a possibility of a sudden power off (SPO) before the user data is stored, the user-data segments are stored in the memory blocks in the super memory block before the metadata segments corresponding to the user-data segments are transferred to a memory die of the super memory block by delaying initial transfer of the metadata segments until the associated user-data segments are stored in the memory die in order to ensure that the user-data segments and the metadata segments are both stored in the super memory block at the time of SPO.

8. The controller according to claim 7, wherein the respective metadata segments comprise respective pieces of map data for the respective user-data segments.

9. The controller according to claim 8, wherein the respective metadata segments comprise journaling information on at least one of the respective user-data segments and the respective pieces of map data.

10. The controller according to claim 7, wherein the segment storage circuit stores the user-data segments or the metadata segments in the super memory block in a sequence in which the user data or the metadata are queued to each virtual die queue.

11. A method for operating a storage device including a semiconductor memory device including a plurality of memory blocks, a plurality of planes which include the memory blocks and a plurality of memory dies in which the planes are included, the method comprising:
    receiving a command from a host;
    queueing user-data segments of user data or metadata segments of metadata determined based on the command to N virtual die queues according to a striping scheme, where N is a natural number; and storing the user-data segments or the metadata segments in memory blocks of a super memory block among a plurality of super memory blocks, wherein the user-data segments and the metadata segments corresponding to the user-data segments are queued in the same virtual die queue, and the user-data segments are queued into the same virtual die queue earlier than the metadata segments corresponding to the user-data segments, and wherein, in response to a possibility of a sudden power off (SPO) before the user data is stored, the user-data segments are stored in the memory blocks in the super memory block before the metadata segments corresponding to the user—data segments are transferred to a memory die of the super memory block by delaying initial transfer of the metadata segments until the associated user-data segments are stored in the memory die in order to ensure that the user-data segments and the metadata segments are both stored in the super memory block at the time of SPO.

12. The method according to claim 11, further comprising keeping the number of memory blocks in each of the super memory blocks the same.

13. The method according to claim 11, wherein the respective metadata segments comprise respective pieces of map data for the respective user-data segments.

14. The method according to claim 13, wherein the respective metadata segments comprise journaling information on at least one of the respective user-data segments and the respective pieces of map data.

15. The method according to claim 11, wherein the user-data segments or the metadata segments are stored in the super memory block in a sequence in which the user data or the metadata are queued to each virtual die queue.

16. The method according to claim 11, wherein the user-data segments and the metadata segments corresponding to the user-data segments are stored in the semiconductor memory device.

* * * * *